(12) United States Patent
Shirota et al.

(10) Patent No.: US 12,601,639 B2
(45) Date of Patent: Apr. 14, 2026

(54) TEMPERATURE MEASUREMENT DEVICE FOR ATTACHEMENT TO A HOUSING, FOR EXAMPLE, A BATTERY CASE

(71) Applicant: NIPPON MEKTRON, LTD., Tokyo (JP)

(72) Inventors: Katsuhito Shirota, Tokyo (JP); Yuki Komuro, Tokyo (JP); Tomoki Kanayama, Tokyo (JP)

(73) Assignee: MEKTEC CORPORATION, Tokyo (JP)

( * ) Notice: Subject to any disclaimer, the term of this patent is extended or adjusted under 35 U.S.C. 154(b) by 358 days.

(21) Appl. No.: 18/364,054

(22) Filed: Aug. 2, 2023

(65) Prior Publication Data

US 2024/0068885 A1      Feb. 29, 2024

(30) Foreign Application Priority Data

Aug. 25, 2022   (JP) ................................ 2022-134400

(51) Int. Cl.
*G01K 7/22*          (2006.01)
*G01K 1/08*          (2021.01)
(Continued)

(52) U.S. Cl.
CPC ................. *G01K 7/22* (2013.01); *G01K 1/08* (2013.01); *G01K 1/14* (2013.01); *H01M 10/486* (2013.01)

(58) Field of Classification Search
CPC ........... G01K 1/14; G01K 1/143; G01K 1/16; H01M 10/48; H01M 10/486; H01M 50/271; Y02E 60/10; Y02T 10/62
See application file for complete search history.

(56) References Cited

U.S. PATENT DOCUMENTS 9,608,298 B2 * 3/2017 Jeong .................. H01M 10/486
2015/0079437 A1 * 3/2015 Jeong .................. H01M 50/271
                                                        429/90

(Continued)

FOREIGN PATENT DOCUMENTS

CN      210092151 U  *  2/2020  .......... H01M 10/425
EP      2849252 A1 *  3/2015  .......... H01M 10/486
(Continued)

OTHER PUBLICATIONS

Computer translation of KR_20200080074_A (Year: 2025).*
Computer translation of CN_210092151 (Year: 2025).*

*Primary Examiner* — Randy W Gibson
(74) *Attorney, Agent, or Firm* — Studebaker Brackett PLLC

(57)          ABSTRACT

Provided is a temperature measurement device including: a case; a flexible printed circuit board attached to the case; a pressing plate; and an elastic body, in which: the flexible printed circuit board includes a thermistor element region; the elastic body is interposed between the thermistor element region and the pressing plate; the pressing plate is configured to press the thermistor element region through the elastic body; the case has a through-hole; as viewed in a direction of pressing the thermistor element region by the pressing plate, the thermistor element region and the elastic body are positioned within an area where the through-hole is provided; and the thermistor element region is configured to protrude, through the through-hole, from an attachment surface side of the case attached to the flexible printed circuit board toward a surface side of the case opposite to the attachment surface side.

6 Claims, 13 Drawing Sheets

(51)  Int. Cl.
      *G01K 1/14*         (2021.01)
      *H01M 10/48*     (2006.01)

(56)             References Cited

U.S. PATENT DOCUMENTS

2016/0380319 A1 *  12/2016  Rhein ................ H01M 50/569
                                        429/90
2021/0148766 A1 *  5/2021  Takase .................... G01K 1/16

FOREIGN PATENT DOCUMENTS

JP         2020-087691 A    6/2020
KR        20200080074 A  *  7/2020  ......... H01M 50/531

* cited by examiner

*FIG. 4A*
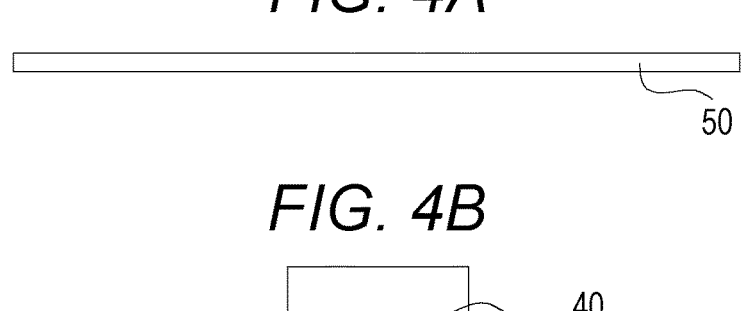
*FIG. 4B*
*FIG. 4C*
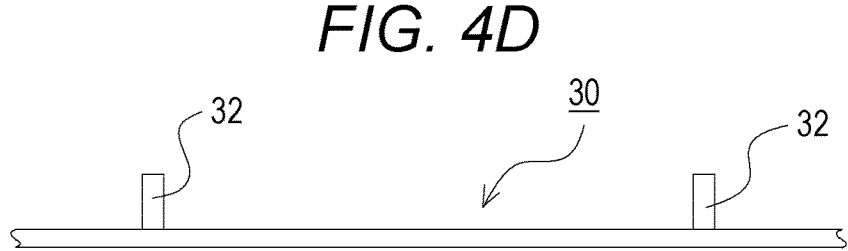
*FIG. 4D*
*FIG. 4E*
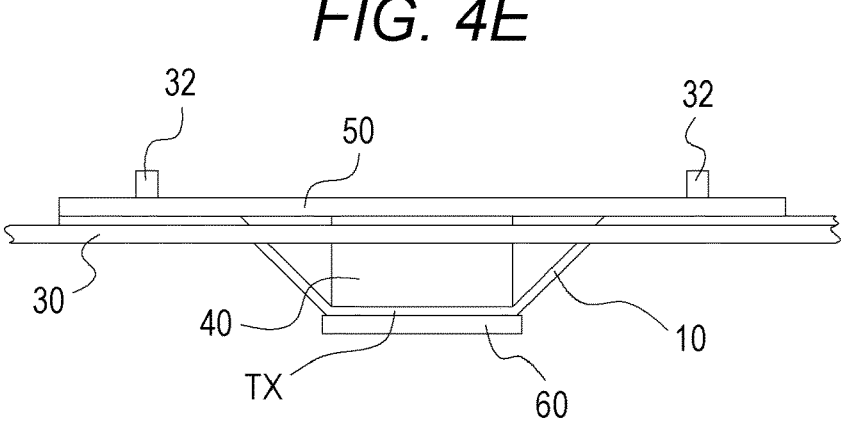

50C

40C 72
71
70

10C
T
TX 37
30C
37  37
31

TEMPERATURE MEASUREMENT DEVICE FOR ATTACHEMENT TO A HOUSING, FOR EXAMPLE, A BATTERY CASE

CROSS-REFERENCE TO RELATED APPLICATION

This application claims priority from Japanese Patent Application No. 2022-134400 filed with the Japan Patent Office on Aug. 25, 2022, the entire content of which is hereby incorporated by reference.

BACKGROUND

1. Technical Field

The present disclosure relates to a temperature measurement device.

2. Related Art

For example, for a battery mounted on. e.g., an electric vehicle or a hybrid vehicle and including multiple cells, a device for measuring the temperature of the battery is provided (see, e.g., JP-A-2020-87691). Generally, a voltage monitoring device for monitoring whether or not the voltages of multiple cells are normal also has a function of measuring temperatures. Such a temperature measurement device according to the related art will be described with reference to FIG. 14. FIG. 14 is a schematic view showing a state in which the temperature measurement device according to the related art is attached to a battery. FIG. 14 shows a schematic sectional view of the temperature measurement device.

The temperature measurement device according to the prior art includes a case 520 fixed to a battery cell 100 which is a measurement target and a flexible printed circuit board 510 (hereinafter referred to as an FPC 510) attached to the case 520. A thermistor element T is electrically connected to a line included in the FPC 510. A contact plate 540 contacting the cell 100 is provided on the opposite side of a portion, at which the thermistor element T is provided, of the FPC 510. An elastic body 530 contacting a thermistor element region TX of the FPC 510 including the portion at which the thermistor element T is provided is provided between the FPC 510 and the case 520.

With the above-described configuration, the thermistor element region TX is pressed by the case 520 through the elastic body 530, and a state of the contact plate 540 stably contacting the surface of the cell 100 is maintained.

In the temperature measurement device configured as described above, the case 520 is provided with a through-hole 520*a*. With this configuration, in assembly of the temperature measurement device, the elastic body 530 is provided between the FPC 510 and the case 520 with the tip end of the FPC 510 inserted through the through-hole 520*a*. In the case of such an assembly process, there are problems that when the assembly process is automated using an assembly robot, operation of the robot is complicated, it is difficult to automate the process, and a cost increases.

SUMMARY

A temperature measurement device of an embodiment of the present disclosure includes: a case; a flexible printed circuit board attached to the case; a pressing plate; and an elastic body, in which: the flexible printed circuit board includes a thermistor element region; the elastic body is interposed between the thermistor element region and the pressing plate; the pressing plate is configured to press the thermistor element region through the elastic body; the case has a through-hole; as viewed in a direction of pressing the thermistor element region by the pressing plate, the thermistor element region and the elastic body are positioned within an area where the through-hole is provided; and the thermistor element region is configured to protrude, through the through-hole, from an attachment surface side of the case attached to the flexible printed circuit board toward a surface side of the case opposite to the attachment surface side.

BRIEF DESCRIPTION OF THE DRAWINGS

FIGS. 4A to 4E are side views of various components forming the temperature measurement device according to the first embodiment of the present disclosure;

DETAILED DESCRIPTION

Figure 1:
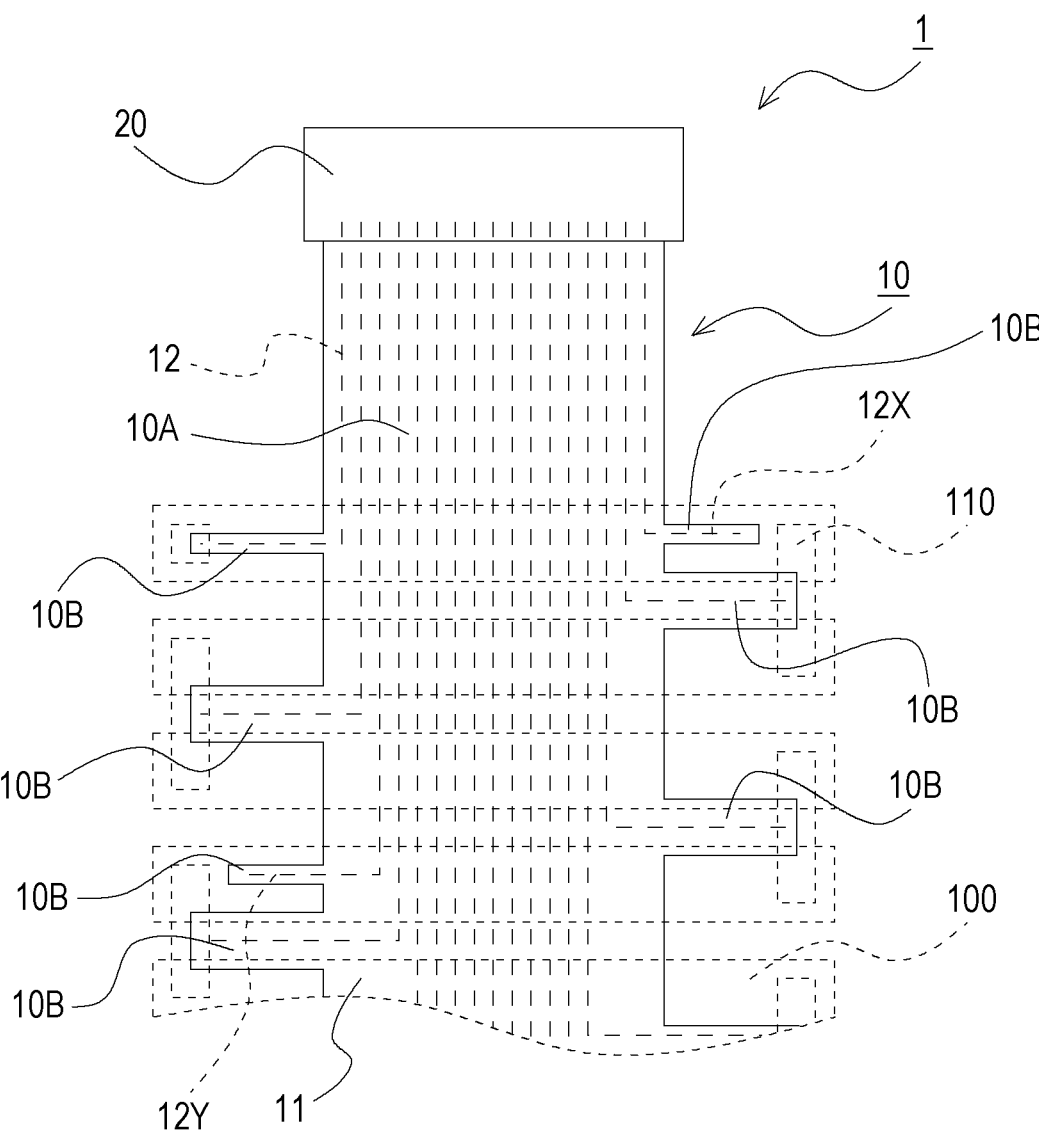
FIG. 1 is a plan view showing a main configuration of a temperature measurement device according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One object of the present disclosure is to provide a temperature measurement device, an assembly process of which is facilitated.

The present disclosure employs the following techniques.

A temperature measurement device according to one aspect of the present disclosure includes: a case; a flexible printed circuit board attached to the case; a pressing plate; and an elastic body, in which: the flexible printed circuit board includes a thermistor element region; the elastic body is interposed between the thermistor element region and the pressing plate; the pressing plate is configured to press the thermistor element region through the elastic body; the case has a through-hole; as viewed in a direction of pressing the thermistor element region by the pressing plate, the thermistor element region and the elastic body are positioned within an area where the through-hole is provided; and the thermistor element region is configured to protrude, through the through-hole, from an attachment surface side of the case attached to the flexible printed circuit board toward a surface side of the case opposite to the attachment surface side.

According to the present disclosure, it can be configured such that the thermistor element region easily protrudes from the attachment surface side of the case attached to the flexible printed circuit board toward the surface side opposite to the attachment surface side.

It is preferable that: the flexible printed circuit board has a first positioning hole and a second positioning hole; the first positioning hole and the second positioning hole are each provided on one side and another side of the thermistor element region; the case or the pressing plate has protrusions each corresponding to the first positioning hole and the second positioning hole; the protrusions are each inserted into the first positioning hole and the second positioning hole, by which the flexible printed circuit board is positioned on the case or the pressing plate; and one of the first positioning hole or the second positioning hole is a long hole.

With this configuration, it can be configured such that the thermistor element region protrudes toward the surface side opposite to the attachment surface side through the through-hole of the case with the protrusions inserted into the positioning holes.

It is preferable that: the temperature measurement device further includes holding member; the holding member has a stopper, and is configured to hold the thermistor element region; and the stopper is configured to reduce dropping of the holding member to the surface side of the case opposite to the attachment surface side through the through-hole.

With this configuration, tilting of the thermistor element region can be reduced. Moreover, when the thermistor element region protrudes toward the surface side opposite to the attachment surface side through the through-hole of the case, dropping of the holding member holding the thermistor element region from the case can be avoided.

It is preferable that the flexible printed circuit board further has, in addition to a line connected to a thermistor element, a line for measuring a voltage of a measurement target.

As described above, according to the present disclosure, the assembly process can be facilitated.

Hereinafter, modes for carrying out the present disclosure will be specifically described as exemplary embodiments with reference to the drawings. Note that unless otherwise specified, the dimensions, materials, shapes, relative arrangement, etc. of components described in these embodiments do not limit the scope of the present disclosure. In the embodiments below, a case where a voltage monitoring device attached to a battery mounted on, e.g., an electric vehicle also has the function of a temperature measurement device will be described as an example. Note that the temperature measurement device according to the present disclosure is applicable to a purpose for measuring the temperatures of various measurement targets.

First Embodiment

Figure 2:
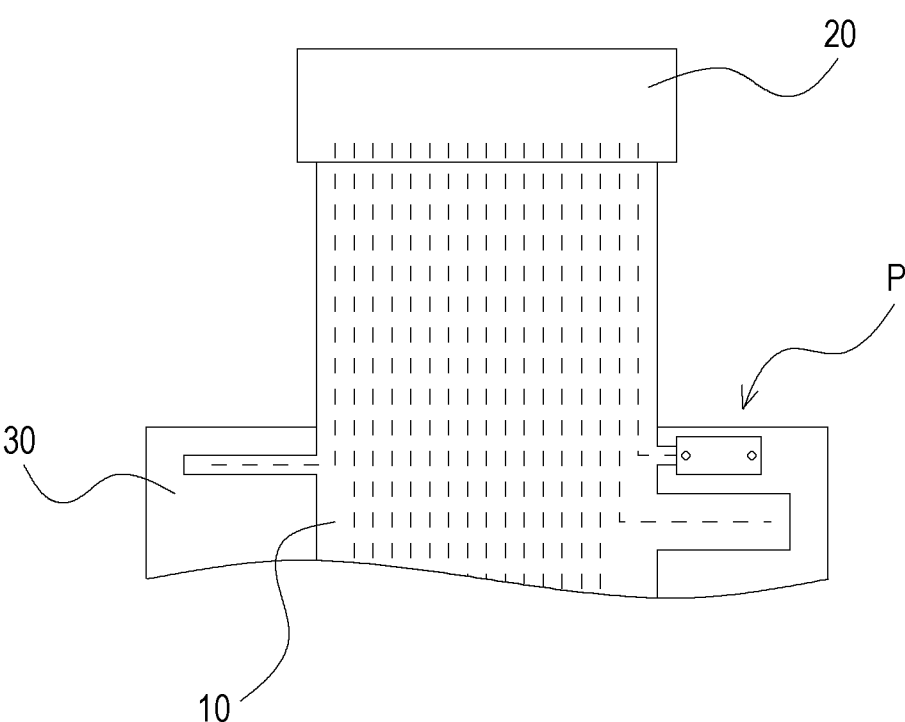
FIG. 2 is a partial plan view of the temperature measurement device according to the first embodiment of the present disclosure.
Figure 3A:
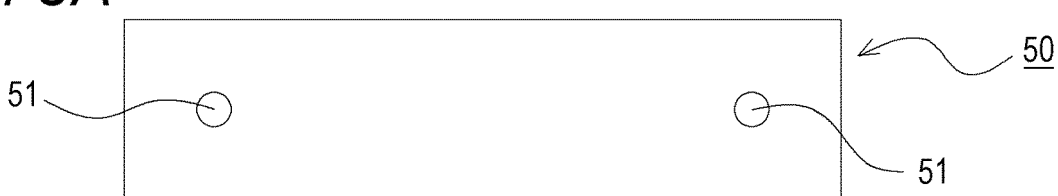
FIGS. 3A to 3E are plan views of various components forming the temperature measurement device according to the first embodiment of the present disclosure.
Figure 3B:
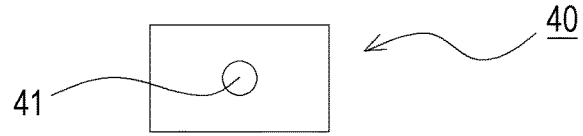
Figure 3C:
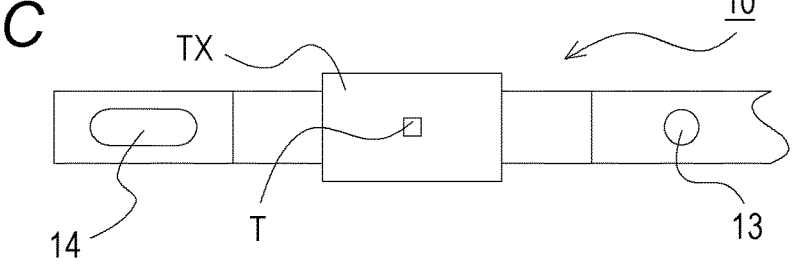
Figure 3D:
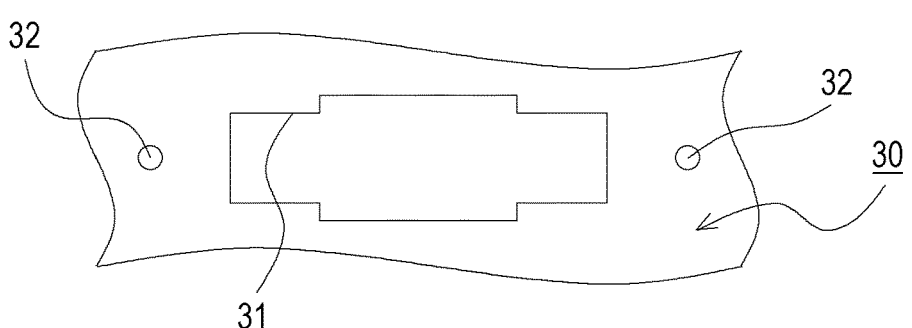
Figure 3E:
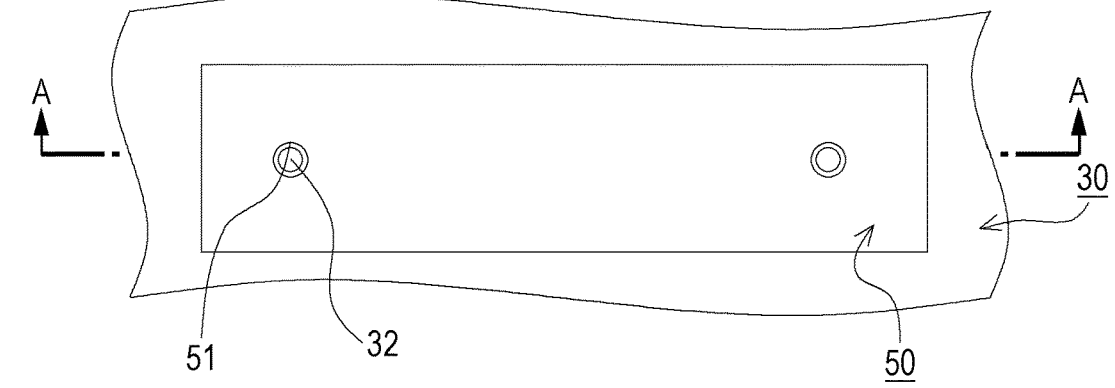
Figure 5:
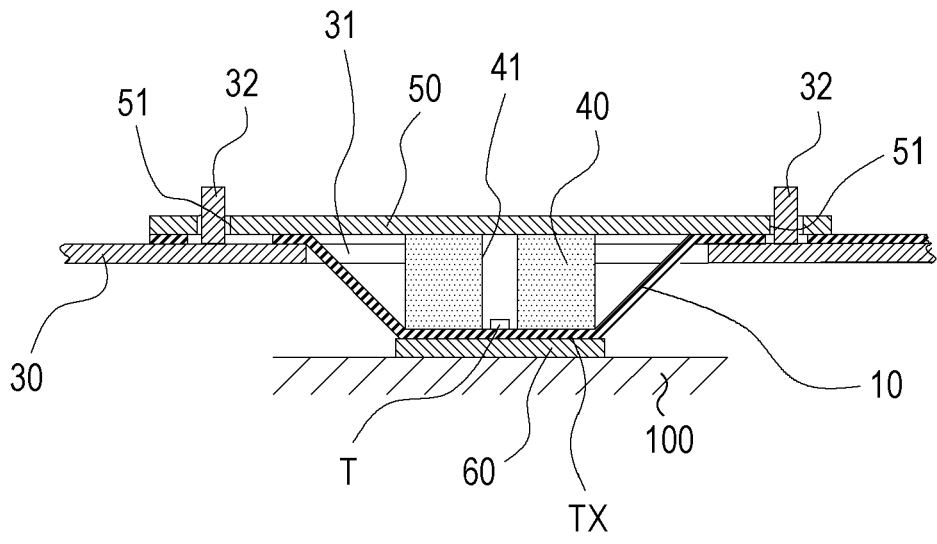
FIG. 5 is a schematic sectional view of the temperature measurement device according to the first embodiment of the present disclosure.

A temperature measurement device according to a first embodiment of the present disclosure will be described with reference to FIGS. 1 to 5. FIG. 1 is a plan view showing a main configuration of the temperature measurement device according to the first embodiment of the present disclosure. FIG. 1 shows only a flexible printed circuit board 10 (hereinafter referred to as an FPC 10) and a connector 20 fixed to the FPC 10 in the configuration of the temperature measurement device. Note that in FIG. 1. e.g., a battery to which a voltage monitoring device 1 functioning as the temperature measurement device is attached is indicated by a dashed line for clarifying a positional relationship with the voltage monitoring device 1. FIG. 2 is a partial plan view of the temperature measurement device according to the first embodiment of the present disclosure, and shows a plan view of the vicinity of the connector 20. FIGS. 3A to 3E are plan views of various components forming the temperature measurement device according to the first embodiment of the present disclosure. FIGS. 3A to 3D show plan views of each component, and FIG. 3E shows a plan view in a state of each component being assembled. FIGS. 4A to 4E are side views of various components forming the temperature measurement device according to the first embodiment of the present disclosure. FIGS. 4A to 4D show side views of each component, and FIG. 4E shows a side view in a state of each component being assembled. FIG. 5 is a schematic sectional view of the temperature measurement device according to the first embodiment of the present disclosure, and is a sectional view taken along an AA line in FIG. 3E.
<Outline of Battery and Voltage Monitoring Device>

The outline of the battery and the voltage monitoring device 1 also having the function of the temperature measurement device will be described. The battery includes multiple cells 100. The battery is a well-known technique, and for this reason, detailed description thereof will be omitted. Electrodes (one is a positive electrode, and the other is a negative electrode) are each provided at both ends of an upper portion of the cell 100. The multiple cells 100 are arrayed such that the positive and negative electrodes of adjacent ones of the cells 100 are adjacent to each other. The adjacent positive and negative electrodes of the multiple cells 100 are electrically connected to each other through bus bars 110, and therefore, the multiple cells 100 are connected in series. Note that in the example shown in FIG. 1, the cells 100 are alternately arranged such that the positive and negative electrodes of adjacent ones of the cells 100 are adjacent to each other. However, a configuration may be employed, in which multiple cells 100 connected in parallel is taken as one pair and the cells 100 of the multiple pairs are alternately arranged such that the positive and negative electrodes of adjacent pairs are next to each other, by which the cells 100 of the multiple pairs are connected in series.

The voltage monitoring device 1 includes a resin case 30 fixed to the measurement target (cell 100 of the battery in present embodiment) and the above-described FPC 10 attached to the case 30. The FPC 10 includes lines 12X, 12Y. The voltage monitoring device 1 includes thermistor elements T included in the FPC 10 and electrically connected to the lines 12X, 12Y of the FPC 10, pressing plates 50 fixed to the case 30, and elastic bodies 40 interposed between the FPC 10 and the pressing plates 50. The pressing plate 50 has a role in pressing a thermistor element region TX of the FPC 10 toward the measurement target through the elastic body 40. The thermistor element region TX is a region of the FPC 10 including a portion at which the thermistor element T is provided. A contact plate 60 contacting the cell 100 is provided, on the FPC 10, on the side opposite to the portion at which the thermistor element T is provided. The contact plate 60 is formed of a plate made of a material (e.g., aluminum) having a high thermal conductivity, and is bonded to the FPC 10 with, e.g., an adhesive or a double-sided tape.

The connector 20 is attached to the tip end of the FPC 10. The connector 20 is connected to a device (not shown) for measuring the voltage and temperature of the cell 100 forming the battery and performing various types of control.

The voltage monitoring device 1 is attached to the upper surface of the battery. Thus, the contact plate 60 contacts the upper surface of the cell 100. Note that the voltages of all the cells 100 of the battery are monitored, but the temperatures of all the cells 100 are not necessarily monitored. Thus, the voltage monitoring device 1 is only required to be provided with, e.g., the number of thermistor elements T according to the number of cells 100 included in the battery and use environment.

<Temperature Measurement Device>

The voltage monitoring device 1 functioning as the temperature measurement device will be more specifically described. As described above, the voltage monitoring device 1 includes the FPC 10 and the case 30. The structure of the FPC 10 is well-known, and for this reason, detailed description thereof will be omitted and one example of a general structure will be briefly described below. The FPC 10 includes a resin film 11 including. e.g., a base film and a cover film and multiple lines 12 formed by etching of copper foil. Note that in FIG. 1, the lines 12 are seen through and are indicated by dashed lines. Generally, a material formed such that copper foil is provided on a base film is prepared, and a desired circuit (lines 12) is formed by etching of the copper foil. Thereafter, a cover film is fixed, with an adhesive, onto the base film and the lines 12. The multiple lines 12 are used as a line for measuring the voltage and a line for measuring the temperature as described above. The lines 12X, 12Y in FIG. 1 are lines for measuring the temperatures.

As shown in FIG. 1, the FPC 10 includes a trunk portion 10A having the multiple lines 12 and multiple branch portions 10B branched from the trunk portion 10A. The lines for measuring the voltages are each electrically connected to the bus bars 110 at the tip ends of the branch portions 10B. The lines 12X, 12Y for measuring the temperatures are connected to the thermistor elements T at the tip ends of the branch portions 10B. A portion indicated by an arrow P in FIG. 2 is a main component portion which is the temperature measurement device configured such that the thermistor element T is provided inside. Hereinafter, details of the main component portion as the temperature measurement device will be described.

Main components of the temperature measurement device are the case 30, the FPC 10, the elastic body 40, and the pressing plate 50. Note that the thermistor element T and the contact plate 60 are attached to the FPC 10 in advance before these components are assembled.

The case 30 is provided with a through-hole 31. Moreover, the case 30 is also provided with positioning protrusions 32 at two locations on both sides of the through-hole 31. The FPC 10 is provided with positioning holes 13, 14 at two locations sandwiching the thermistor element region TX. The two protrusions 32 provided on the case 30 are each inserted into these positioning holes 13, 14. In this manner, the FPC 10 is positioned. In the present embodiment, the positioning hole 14 which is one of the two positioning holes 13, 14 is a long hole. Note that one of the positioning holes 13, 14 is only required to be a long hole. Thus, not the positioning hole 14 but the positioning hole 13 may be a long hole.

The FPC 10 is bent such that the thermistor element region TX protrudes to the contact plate 60 side (see FIGS. 4C, 4E, and 5). Note that in FIG. 4C, a bent portion of the FPC 10 is shown as inclined portions 10X. Note that the FPC 10 is not necessarily bent in advance, but may be bent at the same time as attachment of the pressing plate 50 to the case 30.

The elastic body 40 is made of a foamed rubber-based or urethane foam-based foam material. In the present embodiment, the elastic body 40 has a rectangular parallelepiped shape, and at the center thereof, is provided with a through-hole 41 for arranging the thermistor element T inside. The pressing plate 50 is a plate-shaped member made of resin or metal. The pressing plate 50 according to the present embodiment is provided with positioning holes 51 at two locations. The two protrusions 32 provided on the case 30 are each inserted into the two positioning holes 51.

In a state in which the above-described main components are assembled, the thermistor element region TX and the elastic body 40 are positioned inside an area where the through-hole 31 of the case 30 is provided, as viewed in the direction of pressing by the pressing plate 50.

Using the above-described main components, a portion functioning as the temperature measurement device may be assembled in such a manner that the elastic body 40 is attached after attachment of the FPC 10 to the case 30 and the pressing plate 50 is subsequently attached thereto, for example. Accordingly, the thermistor element region TX of the FPC 10 is in a state of being pressed by the pressing plate 50 through the elastic body 40 and a state of protruding, through the through-hole 31 of the case 30, from the attachment surface side of the case 30 attached to the FPC 10 toward the surface side of the case 30 opposite to the surface attached to the FPC 10.

Note that in assembly as described above, the FPC 10, the elastic body 40, and the pressing plate 50 are only stacked on and attached to the case 30 from above in this order. Thus, an assembly process can be easily automated using an automated machine such as an assembly robot. In the case of employing the above-described assembly method, the elastic body 40 is not necessarily bonded to the FPC 10 or the pressing plate 50 with, e.g., an adhesive or a double-sided tape. Note that for more reliably fixing the members to each other, the elastic body 40 and the FPC 10 may be bonded to each other with an adhesive or a double-sided tape and the elastic body 40 and the pressing plate 50 may be bonded to each other with an adhesive or a double-sided tape.

Using, e.g., the automated machine, the assembly process may be performed after the elastic body 40 and the FPC 10 have been bonded to each other in advance. In this case, the FPC 10 to which the elastic body 40 is bonded is attached to the case 30, and thereafter, the pressing plate 50 is attached thereto. In this manner, the portion functioning as the temperature measurement device may be assembled. Alternatively, the assembly process may be performed using, e.g., the automated machine after the elastic body 40 and the pressing plate 50 have been bonded to each other in advance. In this case, the FPC 10 is attached to the case 30, and thereafter, the pressing plate 50 to which the elastic body 40 is bonded is attached thereto. In this manner, the portion functioning as the temperature measurement device can be assembled. As another alternative, the assembly process may be performed using, e.g., the automated machine after the elastic body 40 and the FPC 10 have been bonded to each other and the elastic body 40 and the pressing plate 50 have been bonded to each other in advance. In this case, the FPC 10, the elastic body 40, and the pressing plate 50 integrally bonded to each other are attached to the case 30, and in this manner, the portion functioning as the temperature measurement device can be assembled.

In any of the above-described assembly methods, various components are only stacked on and attached to the case 30 from above, and therefore, the assembly process can be easily automated using the automated machine such as the assembly robot. Note that for fixing the pressing plate 50 to the case 30. e.g., a configuration in which the protrusions 32 provided on the case 30 are press-fitted in the positioning holes 51 of the pressing plate 50 may be employed. In this case, the outer peripheral surface of the protrusion 32 is preferably formed as such a tapered surface that the diameter of the protrusion 32 decreases toward the tip end. Note that fixing of the pressing plate 50 to the case 30 is not limited to the press-fit structure and various well-known fixing structures may be employed.

<Advantages of Temperature Measurement Device According to Present Embodiment>

According to the temperature measurement device of the present embodiment, the thermistor element region TX of the FPC 10 and the elastic body 40 are positioned within the area where the through-hole 31 of the case 30 is provided, as viewed in the direction of pressing by the pressing plate 50. Thus, the assembly process can be facilitated. That is, various components are only stacked on and attached to the case 30 from above, and therefore, the assembly process can be easily automated using the automated machine such as the assembly robot.

In the present embodiment, the positioning hole 14 which is one of the two positioning holes 13, 14 provided in the FPC 10 is the long hole longer in the right-left direction than in the up-down direction as viewed in plane. With this configuration, even in a case where the FPC 10 is not bent in advance, the thermistor element region TX can properly protrude, through the through-hole 31 of the case 30, from the attachment surface side of the case 30 attached to the FPC 10 toward the surface side of the case 30 opposite to the surface attached to the FPC 10. That is, in a case where the FPC 10 is not bent in advance, when the FPC 10 is arranged such that the two protrusions 32 of the case 30 are each inserted into the positioning holes 13, 14 of the FPC 10, the left protrusion 32 of the case 30 in FIG. 3D is inserted into a position closer to the right in FIG. 3C in the long positioning hole 14. Thereafter, when the FPC 10 is bent in such a manner that the thermistor element region TX is pressed against the pressing plate 50 through the elastic body 40 by attachment of the pressing plate 50 to the case 30, a left portion of the FPC 10 with respect to the thermistor element region TX is pulled rightward in FIG. 3C. As described above, since the positioning hole 14 is the long hole, the left portion of the FPC 10 with respect to thermistor element region TX is slidable rightward in FIG. 3C. Thus, the thermistor element region TX can properly protrude, through the through-hole 31 of the case 30, from the attachment surface side of the case 30 attached to the FPC 10 toward the surface side of the case 30 opposite to the surface attached to the FPC 10.

Further, in the present embodiment, the positioning holes 13, 14 provided on both sides of the thermistor element region TX in the FPC 10 are fixed by the protrusions 32 of the case 30. Thus, tilting of the thermistor element region TX due to displacement caused by expansion and contraction of the cell 100 in charge and discharge can be reduced by tension of the inclined portions 10X (see FIG. 4) of the FPC 10 on both sides of the thermistor element region TX. In the present embodiment, since tilting of the thermistor element region TX with respect to the cell 100 can be reduced as described above, the state of contact of the contact plate 60 with the cell 100 can be stably maintained and degradation of temperature measurement accuracy can be reduced.

Second Embodiment

Figure 6:
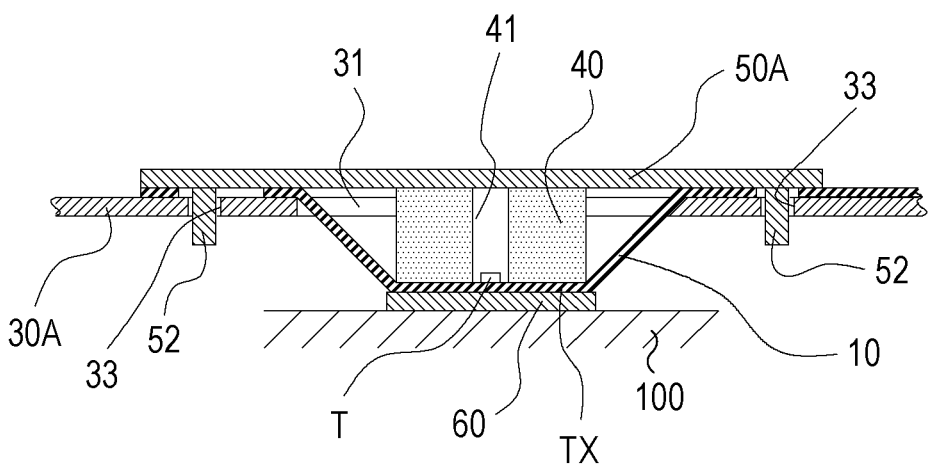
FIG. 6 is a schematic sectional view of a temperature measurement device according to a second embodiment of the present disclosure.

FIG. 6 shows a second embodiment of the present disclosure. In the above-described embodiment, the configuration in which the positioning protrusions are provided on the case has been described. However, in the present embodiment, a configuration where positioning protrusions are provided on a pressing plate will be described. Other configurations and features are the same as those of the first embodiment, and therefore, the same reference numerals are used to represent the same components and description thereof will be omitted as necessary.

FIG. 6 is a schematic sectional view of a temperature measurement device according to the second embodiment of the present disclosure, and as in FIG. 5 in the first embodiment, is a sectional view corresponding to the section taken along the AA line in FIG. 3E.

In the present embodiment, main components of the temperature measurement device are, as in the first embodiment, a case 30A, an FPC 10, an elastic body 40, and a pressing plate 50A. Note that a thermistor element T and a contact plate 60 are attached to the FPC 10 in advance before these components are assembled. The configurations of the FPC 10 and the elastic body 40 are the same as those of the first embodiment. The case 30A is different from the case 30 of the first embodiment in that positioning holes 33 are provided at two locations instead of the two protrusions 32. Moreover, the pressing plate 50A is different from the pressing plate 50 of the first embodiment in that protrusions 52 are provided at two locations instead of the two positioning holes 51.

As m the first embodiment, a thermistor element region TX of the FPC 10 and the elastic body 40 are positioned within an area where a through-hole 31 of the case 30A is provided, as viewed in the direction of pressing by the pressing plate 50A.

In the present embodiment, the FPC 10 is mounted on the case 30A, and thereafter, the elastic body 40 is mounted thereon. Then, the pressing plate 50A is attached. In this manner, a portion functioning as the temperature measurement device can be assembled. Thus, the thermistor element region TX of the FPC 10 is in a state of being pressed by the pressing plate 50A through the elastic body 40 and a state of protruding, through the through-hole 31, from the attachment surface side of the case 30A attached to the FPC 10 toward the surface side of the case 30A opposite to the surface attached to the FPC 10. Note that when the FPC 10 is mounted on the case 30A, a tool such as a positioning pin may be used for aligning the two positioning holes 33 provided in the case 30A and positioning holes 13, 14 provided in the FPC 10.

In the present embodiment, in assembly as described above, the FPC 10, the elastic body 40, and the pressing plate 50A are only stacked on and attached to the case 30A from above in this order. Thus, an assembly process can be easily automated using an automated machine such as an assembly robot. Note that the present embodiment is similar to the first embodiment in that the elastic body 40 may or may not be bonded to the FPC 10 or the pressing plate 50A with, e.g., an adhesive or a double-sided tape. In the case of bonding these components, the present embodiment is also similar to the first embodiment in that the components integrally bonded to each other in advance may be attached. Note that in the case of bonding the FPC 10 and the pressing plate 50A to each other in advance, the protrusions 52 provided on the pressing plate 50A are only inserted into the positioning holes 13, 14 of the FPC 10, and therefore, such a bonding process can be easily performed. As a structure for fixing the pressing plate 50A and the case 30A to each other, various structures may be employed as described in the first embodiment.

The temperature measurement device configured as described above can also produce advantageous effects similar to those of the first embodiment.

Third Embodiment

Figure 7A:
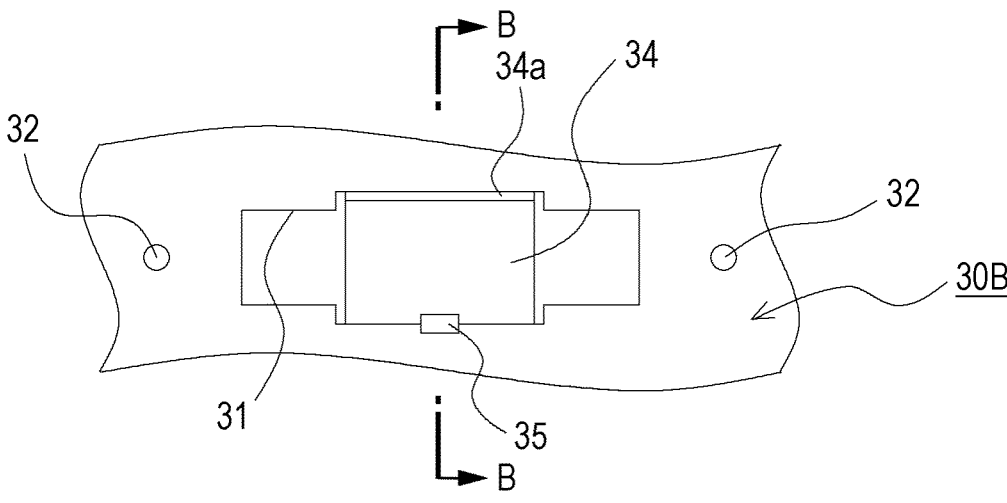
FIGS. 7A to 7C are schematic views of the configuration of a temperature measurement device according to a third embodiment of the present disclosure.
Figure 7B:
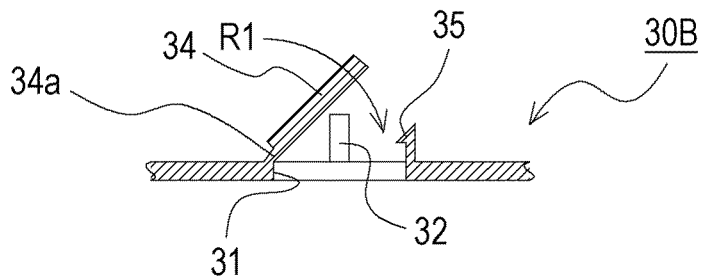
Figure 7C:
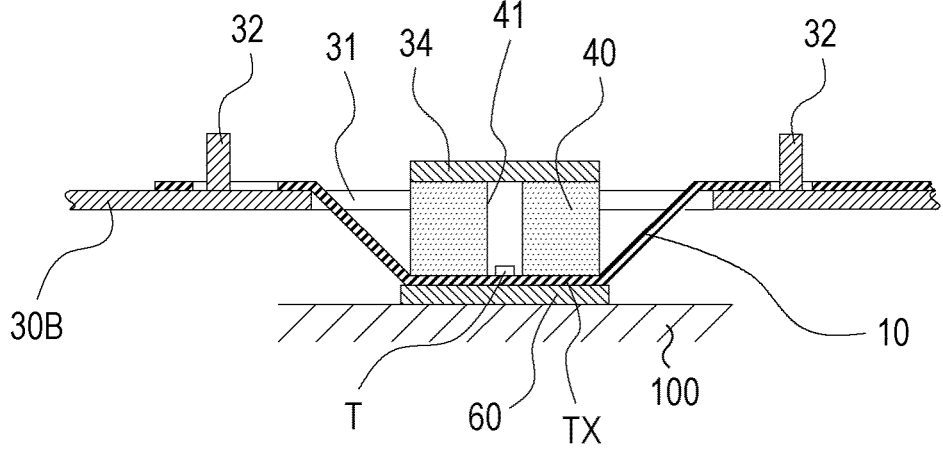
Figure 8A:
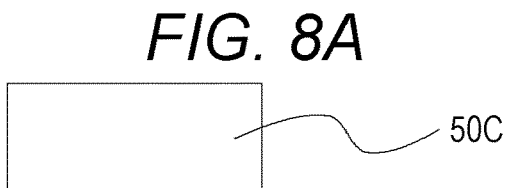
FIGS. 8A to 8E are plan views of various components forming a temperature measurement device according to a fourth embodiment of the present disclosure.
Figure 8B:
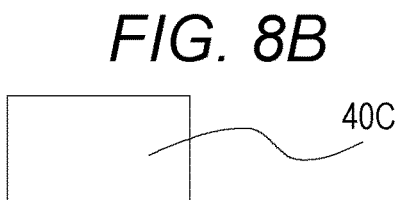
Figure 8C:
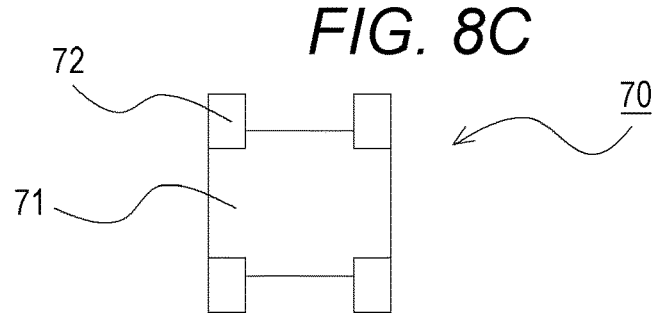
Figure 8D:
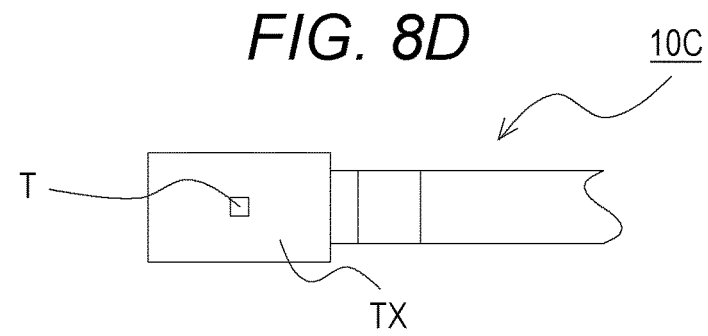
Figure 8E:
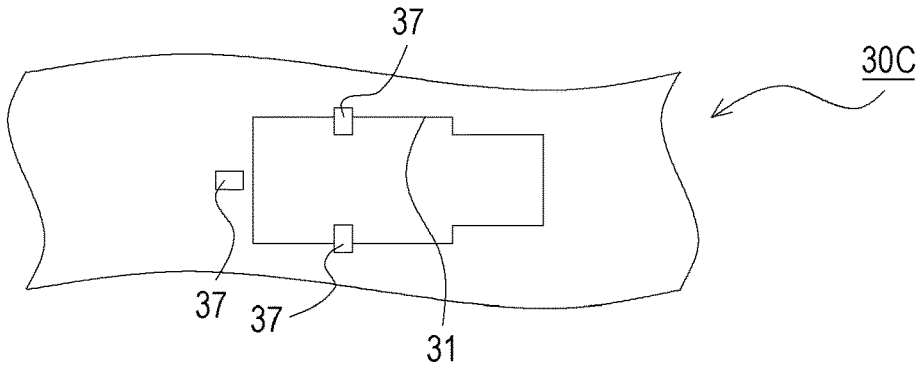
Figure 9A:
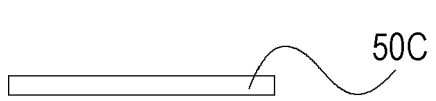
FIGS. 9A to 9E are side views of various components forming the temperature measurement device according to the fourth embodiment of the present disclosure.
Figure 9B:
Figure 9C:
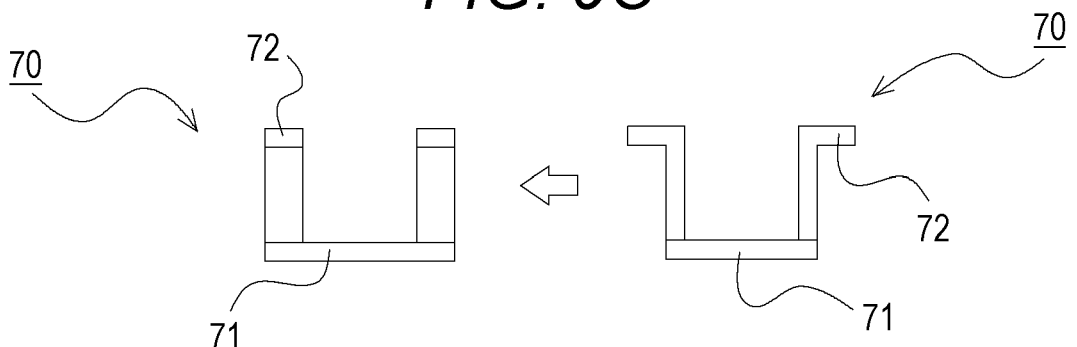
Figure 9D:
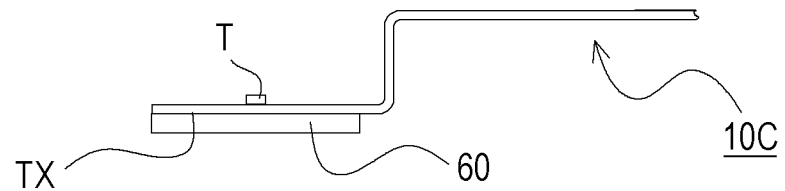
Figure 9E:
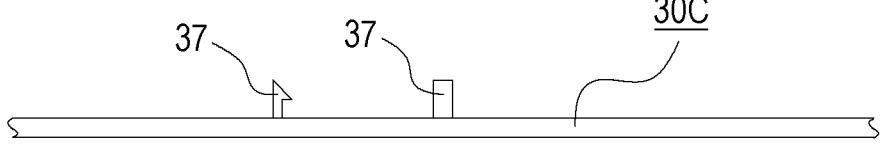

FIGS. 7A to 7C show a third embodiment of the present disclosure. In the first embodiment, the case where the pressing plate is formed of the independent member has been described. However, in the present embodiment, a configuration where a pressing plate is provided integrally with a case will be described. Other configurations and features are the same as those of the first embodiment, and therefore, the same reference numerals are used to represent the same components and description thereof will be omitted as necessary.

FIGS. 7A to 7C are schematic views of the configuration of a temperature measurement device according to the third embodiment of the present disclosure. FIG. 7A is a plan view showing part of a case 30B according to the present embodiment. FIG. 7B is a sectional view taken along a BB line in FIG. 7A. FIG. 7C is a schematic sectional view of the temperature measurement device according to the present embodiment, and as in FIG. 5 in the first embodiment, is a sectional view corresponding to the section taken along the AA line in FIG. 3E. In the present embodiment, main components of the temperature measurement device are the case 30B, an FPC 10, and an elastic body 40. Note that a thermistor element T and a contact plate 60 are attached to the FPC 10 in advance before these components are assembled. The configurations of the FPC 10 and the elastic body 40 are the same as those of the first embodiment.

As in the case 30 of the first embodiment, the case 30B according to the present embodiment is also provided with a through-hole 31 and two positioning protrusions 32. Moreover, the case 30B according to the present embodiment is provided with a pressing plate 34 such that part of the through-hole 31 is closed with the pressing plate 34. The pressing plate 34 is coupled, by a hinge portion 34a, integrally with a body portion of the case 30B. With this configuration, the pressing plate 34 is rotatable in the direction of an arrow R1 as shown in FIG. 7B. As in the first embodiment, a thermistor element region TX of the FPC 10 and the elastic body 40 are positioned within an area where the through-hole 31 of the case 30B is provided, as viewed in the direction of pressing by the pressing plate 34.

In the present embodiment, the FPC 10 is attached to the case 30B with the entirety of the through-hole 31 opened, and thereafter, the elastic body 40 is attached thereto. Then, the pressing plate 34 is rotated in the direction of the arrow R1 to close part of the through-hole 31. In this manner, a portion functioning as the temperature measurement device can be assembled. Note that as shown in. e.g., FIG. 7B, the case 30B may be provided with an engagement protrusion 35 engaging with the pressing plate 34. The engagement protrusion 35 engages with an end portion of the pressing plate 34 opposite to the hinge portion 34a when the pressing plate 34 is rotated in the direction of the arrow R1 to close part of the through-hole 31, so that the pressing plate 34 can be positioned. Note that a structure for positioning the pressing plate 34 is not limited to this structure and various well-known structures may be employed. By assembly as described above, the thermistor element region TX of the FPC 10 is in a state of being pressed by the pressing plate 34 through the elastic body 40 and a state of protruding, through the through-hole 31 of the case 30B, from the attachment surface side of the case 30B attached to the FPC 10 toward the surface side of the case 30B opposite to the surface attached to the FPC 10.

In the present embodiment, in assembly as described above, the FPC 10 and the elastic body 40 are only stacked on and attached to the case 30B from above in this order, and thereafter, the pressing plate 34 is only rotated. Thus, an assembly process can be easily automated using an automated machine such as an assembly robot. Note that the present embodiment is similar to the first embodiment in that the elastic body 40 may or may not be bonded to the FPC 10 with, e.g., an adhesive or a double-sided tape. In the case of bonding these components, the present embodiment is also similar to the first embodiment in that the components integrally bonded to each other in advance may be attached.

The temperature measurement device configured as described above can also produce advantageous effects similar to those of the first embodiment.

Fourth Embodiment

FIGS. 8A to 10C show a fourth embodiment of the present disclosure. In the present embodiment, a configuration where a temperature measurement device of the present disclosure includes a holding member holding a thermistor element region of an FPC will be described.

Figure 10A:
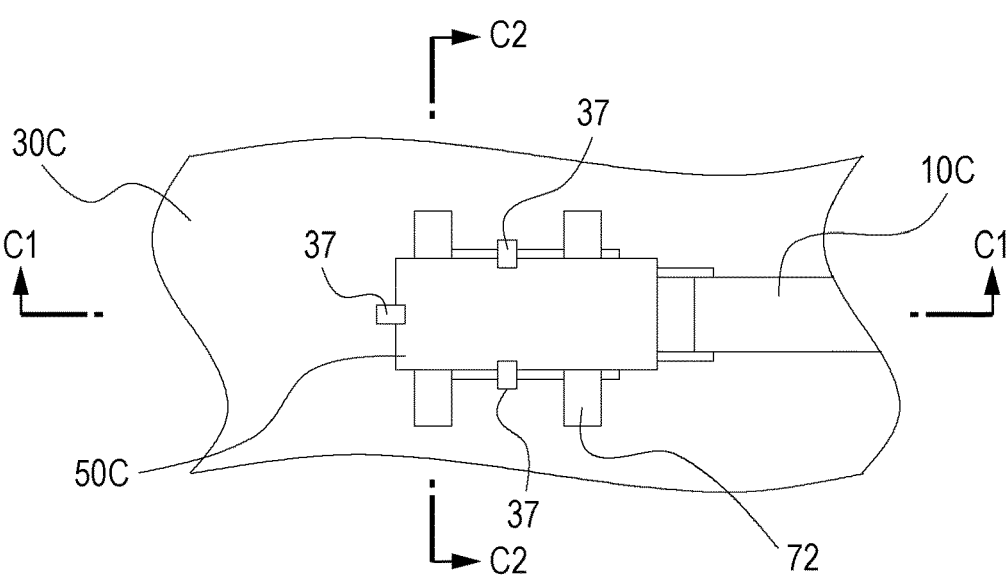
FIGS. 10A to 10C are schematic views of the configuration of the temperature measurement device according to the fourth embodiment of the present disclosure.
Figure 10B:
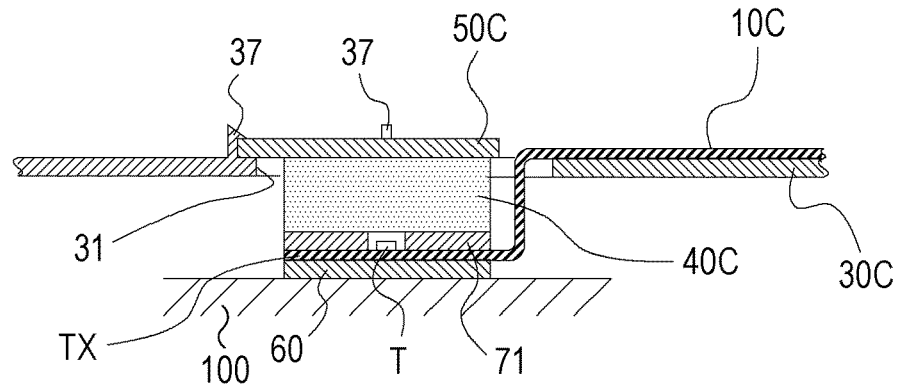
Figure 10C:
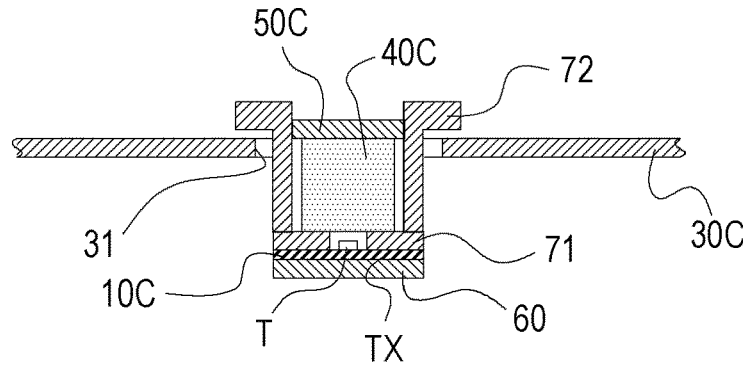

FIGS. 8A to 8E show plan views of various components forming a temperature measurement device according to the fourth embodiment of the present disclosure. FIGS. 9A to 9E show side views of various components forming the temperature measurement device according to the fourth embodiment of the present disclosure. FIGS. 10A to 10C are schematic views of the configuration of the temperature measurement device according to the fourth embodiment of the present disclosure. FIG. 10A is a plan view showing part of the temperature measurement device according to the present embodiment, FIG. 10B is a sectional view taken along a C1C1 line in FIG. 10A, and FIG. 10C is a sectional view taken along a C2C2 line in FIG. 10A.

A battery and a voltage monitoring device also having the function of the temperature measurement device are as described in the first embodiment.

Main components of the temperature measurement device according to the present embodiment are a case 30C, an FPC 10C, a holding member 70, an elastic body 40C, and a pressing plate 50C. Note that a thermistor element T and a contact plate 60 are attached to the FPC 10C in advance before these components are assembled.

As in each of the above-described embodiments, the resin case 30C according to the present embodiment is also provided with a through-hole 31. The FPC 10C according to the present embodiment has a basic configuration similar to that of the FPC 10 described in the first embodiment, and includes a trunk portion 10A and multiple branch portions 10B. Further, the FPC 10C includes a resin film 11 and multiple lines 12.

The holding member 70 is made of a material having a high stiffness, such as metal or resin. The holding member 70 includes a holing plate portion 71 holding a thermistor element region TX of the FPC 10C including a portion at which the thermistor element T is provided and stoppers 72 for reducing dropping of the holding member 70 from the case 30C. In the present embodiment, the stoppers 72 are each provided at four corners of the holding member 70 as viewed in plane, and each stopper 72 is coupled to the holing plate portion 71. Each stopper 72 is provided so as to extend to the outside of the through-hole 31 after having extended upward from the holing plate portion 71 through the through-hole 31 of the case 30C. A through-hole for arranging the thermistor element T inside is provided at the center of the holing plate portion 71. The holing plate portion 71 of the holding member 70 and the thermistor element region TX of the FPC 10C are bonded to each other with, e.g., an adhesive or a double-sided tape. Note that in the present embodiment, the thermistor element region TX is bonded to the lower surface of the holing plate portion 71. Such a bonding process may be performed by an automated machine.

The elastic body 40C is made of a foamed rubber-based or urethane foam-based foam material. In the present embodiment, the elastic body 40C has a rectangular parallelepiped shape. The pressing plate 50C is a plate-shaped member made of resin or metal. As in the first embodiment, the thermistor element region TX of the FPC 10C and the elastic body 40C are positioned within an area where the through-hole 31 of the case 30C is provided, as viewed in the direction of pressing by the pressing plate 50C.

Using the above-described main components, a portion functioning as the temperature measurement device may be assembled in such a manner that the elastic body 40C is attached after the holding member 70 to which the FPC 10C is bonded has been attached to the case 30C and the pressing plate 50C is subsequently attached thereto, for example. The pressing plate 50C is fixed to the case 30C. A structure for fixing the pressing plate 50C to the case 30C is not specifically limited, and for example, a structure in which the case 30C is provided with an engagement protrusion 37 and the pressing plate 50C engages with the engagement protrusion 37 may be employed. Along with attachment of the pressing plate 50C to the case 30C, the holding member 70 and the thermistor element region TX of the FPC 10C are pressed by the pressing plate 50C through the elastic body 40C.

With the above-described configuration, the thermistor element region TX of the FPC 10C is in a state of protruding, through the through-hole 31 of the case 30C, from the attachment surface side of the case 30C attached to the FPC 10C toward the surface side of the case 30C opposite to the surface attached to the FPC 10C. Note that the holding member 70 is provided with the stoppers 72, and therefore, the holding member 70 does not drop to the surface side of the case 30C opposite to the surface attached to the FPC 10C through the through-hole 31 of the case 30C even when the holding member 70 is pressed by the pressing plate 50C through the elastic body 40C.

Note that in assembly as described above, the holding member 70 to which the FPC 10C is bonded, the elastic body 40C, and the pressing plate 50C are only stacked on and attached to the case 30C from above in this order. Thus, an assembly process can be easily automated using an automated machine such as an assembly robot. In the case of employing the above-described assembly method, the elastic body 40C is not necessarily bonded to the holding member 70 or the pressing plate 50C with, e.g., an adhesive or a double-sided tape. Note that for more reliably fixing the components to each other, the elastic body 40C and the holding member 70 may be bonded to each other with an adhesive or a double-sided tape and the elastic body 40C and the pressing plate 50C may be bonded to each other with an adhesive or a double-sided tape.

Using, e.g., the automated machine, the assembly process may be performed after the elastic body 40C and the holding member 70 have been bonded to each other in advance. In this case, the pressing plate 50C is attached after the holding member 70 to which the FPC 10C and the elastic body 40C are bonded has been attached to the case 30C, so that the portion functioning as the temperature measurement device can be assembled. Alternatively, the assembly process may be performed using, e.g., the automated machine after the elastic body 40C and the pressing plate 50C have been bonded to each other in advance. In this case, the holding member 70 to which the FPC 10 is bonded is attached to the case 30C, and thereafter, the pressing plate 50C to which the elastic body 40C is bonded is attached thereto. In this manner, the portion functioning as the temperature measurement device can be assembled. As another alternative, the assembly process may be performed using. e.g., the automated machine after the elastic body 40 and the holding member 70 have been bonded to each other and the elastic body 40C and the pressing plate 50C have been bonded to each other in advance. In this case, the FPC 10C, the holding member 70, the elastic body 40C, and the pressing plate 50C integrally bonded to each other are attached to the case 30C, and in this manner, the portion functioning as the temperature measurement device can be assembled.

In any of the above-described assembly methods, various components are only stacked on and attached to the case 30C from above, and therefore, the assembly process can be easily automated using the automated machine such as the assembly robot.

The temperature measurement device configured as described above can also produce advantageous effects similar to those of the first embodiment. Moreover, in the present embodiment, the holding member 70 can reduce tilting of the thermistor element region TX of the FPC 10C.

Fifth Embodiment

Figure 11A:
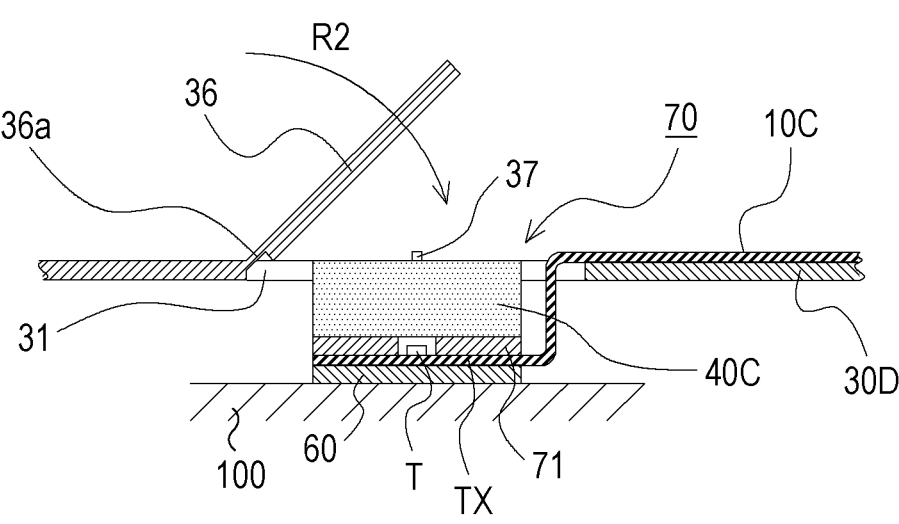
FIGS. 11A and 11B are schematic sectional views of a temperature measurement device according to a fifth embodiment of the present disclosure.
Figure 11B:
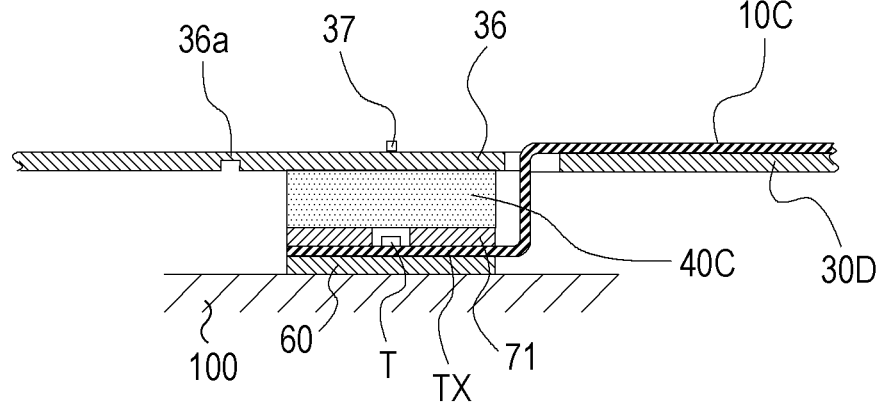
Figure 12A:
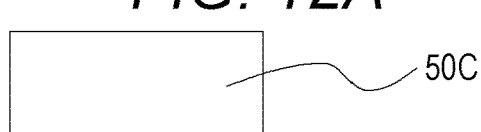
FIGS. 12A to 12E are plan views of various components forming a temperature measurement device according to a sixth embodiment of the present disclosure.
Figure 12B:
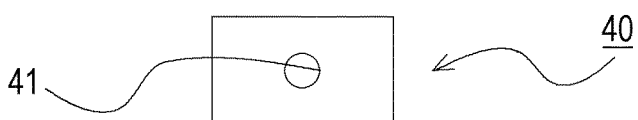
Figure 12C:
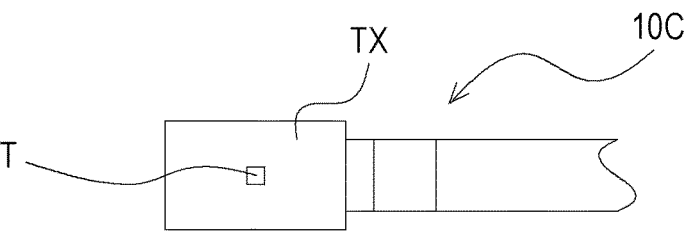
Figure 12D:
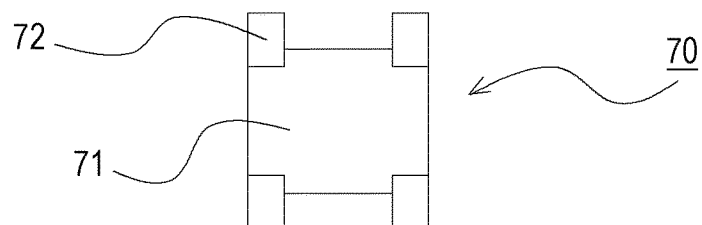
Figure 12E:
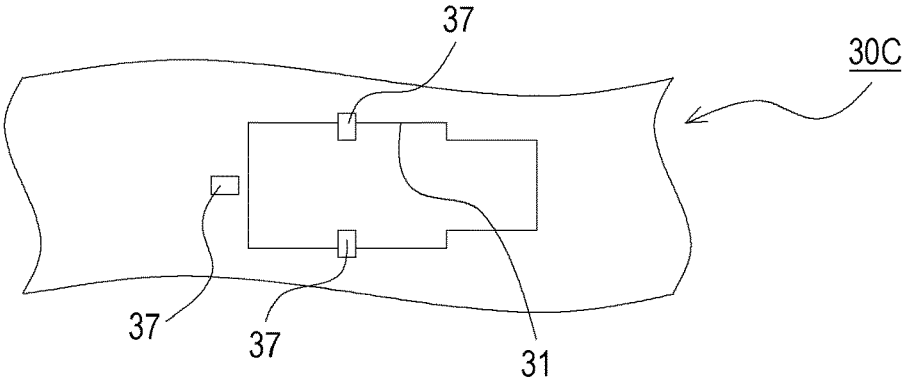

FIGS. 11A and 11B show a fifth embodiment of the present disclosure. In the fourth embodiment, the case where the pressing plate is formed of the independent member has been described. However, in the present embodiment, a configuration where a pressing plate is provided integrally with a case will be described. Other configurations and features are the same as those of the fourth embodiment, and therefore, the same reference numerals are used to represent the same components and description thereof will be omitted as necessary.

FIGS. 11A and 11B are schematic sectional views of a temperature measurement device according to the fifth embodiment of the present disclosure, and as in FIG. 10B in the fourth embodiment, are sectional views corresponding to the section taken along the C1C1 line in FIG. 10A. Note that FIG. 11A shows a state in the middle of rotation of the pressing plate and FIG. 11B shows a state after the pressing plate has been rotated.

In the present embodiment, main components of the temperature measurement device are a case 30D, a holding member 70, an FPC 10C, and an elastic body 40C. Note that a thermistor element T and a contact plate 60 are attached to the FPC 10C in advance before these components are assembled. The configurations of the holding member 70, the FPC 10C, and the elastic body 40C are the same as those of the fourth embodiment.

As in the case 30C of the fourth embodiment, the case 30D according to the present embodiment is also provided with a through-hole 31. Moreover, the case 30D according to the present embodiment is provided with a pressing plate 36 such that part of the through-hole 31 is closed with the pressing plate 36. The pressing plate 36 is coupled, by a hinge portion 36a, integrally with a body portion of the case 30D. With this configuration, the pressing plate 36 is rotatable in the direction of an arrow R2 in the figure, as shown in FIG. 11A. As in the first embodiment, a thermistor element region TX of the FPC 10C and the elastic body 40C are positioned within an area where the through-hole 31 of the case 30D is provided, as viewed in the direction of pressing by the pressing plate 36.

In the present embodiment, the holding member 70 to which the FPC 10C is bonded is attached to the case 30D with the entirety of the through-hole 31 opened, and thereafter, the elastic body 40C is attached thereto. Then, the pressing plate 36 is rotated in the direction of the arrow R2 to close part of the through-hole 31. In this manner, a portion functioning as the temperature measurement device can be assembled. Note that a structure for fixing the pressing plate 36 is as described in the third embodiment. By assembly as described above, the thermistor element region TX of the FPC 10C is in a state of protruding, through the through-hole 31 of the case 30D, from the attachment surface side of the case 30D attached to the FPC 10C toward the surface side of the case 30D opposite to the surface attached to the FPC 10C.

In the present embodiment, in assembly as described above, the holding member 70 to which the FPC 10C is bonded and the elastic body 40C are only stacked on and attached to the case 30D from above in this order, and thereafter, the pressing plate 36 is only rotated. Thus, an assembly process can be easily automated using an automated machine such as an assembly robot. Note that the present embodiment is similar to the fourth embodiment in that the elastic body 40C may or may not be bonded to the holding member 70 with, e.g., an adhesive or a double-sided tape. In the case of bonding these components, the present embodiment is also similar to the fourth embodiment in that the components integrally bonded to each other in advance may be attached.

The temperature measurement device configured as described above can also produce advantageous effects similar to those of the fourth embodiment.

Sixth Embodiment

FIGS. 12A to 12E and FIGS. 13A to 13C show a sixth embodiment of the present disclosure. In the present embodiment, a configuration where a holding member holding a thermistor element region of an FPC is provided will be described.

Figure 13A:
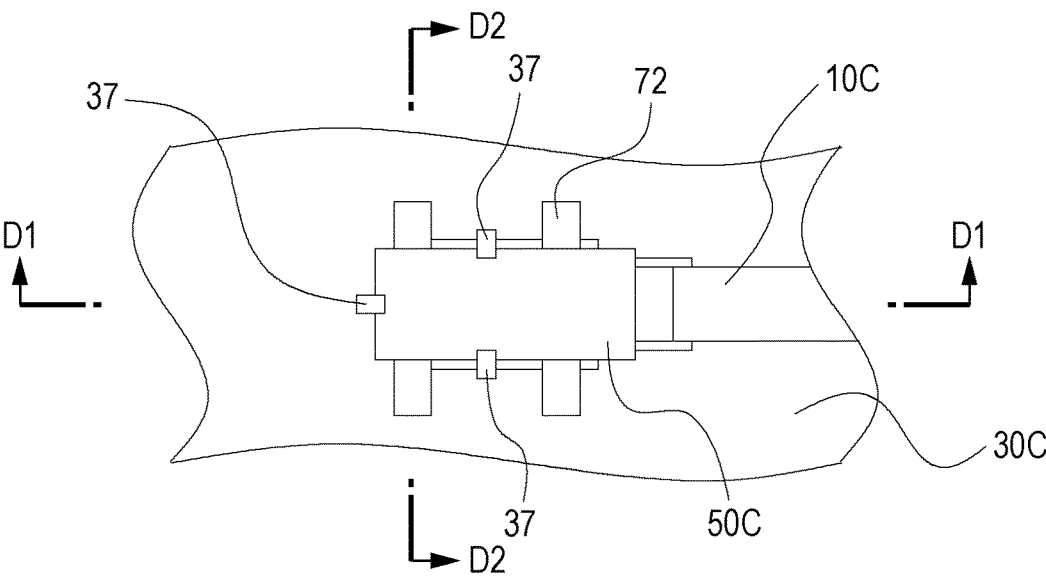
FIGS. 13A to 13C are schematic views of the configuration of the temperature measurement device according to the sixth embodiment of the present disclosure.
Figure 13B:
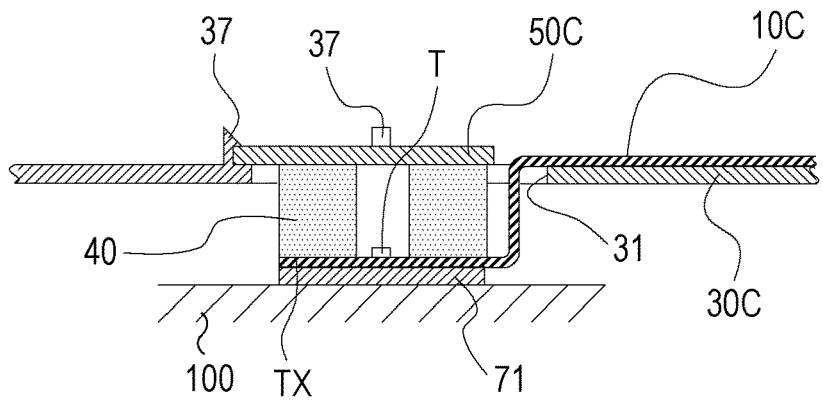
Figure 13C:
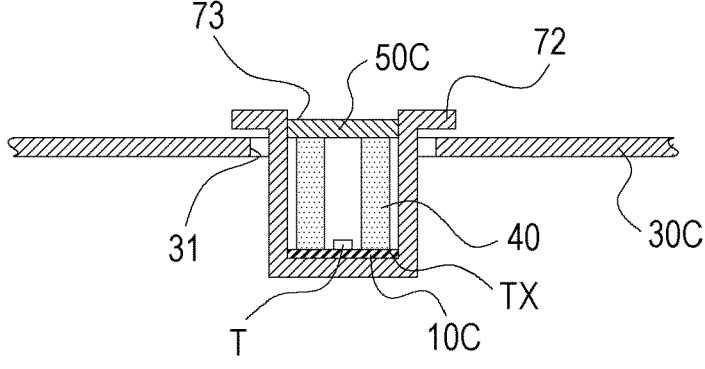
Figure 14:
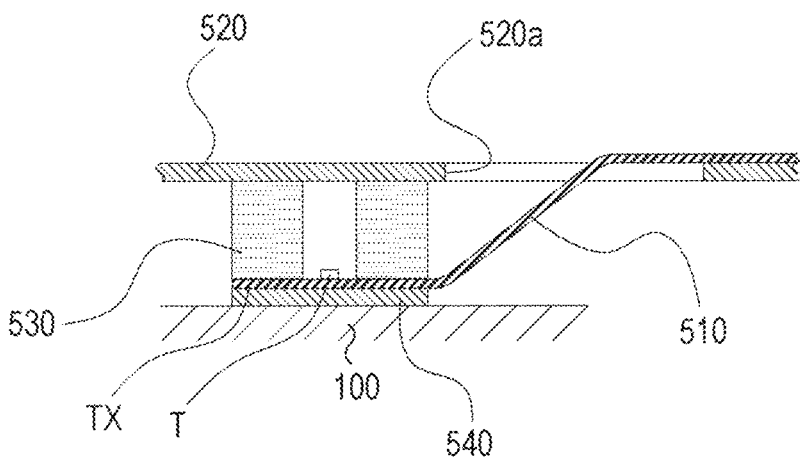
FIG. 14 is a schematic sectional view of a temperature measurement device according to the related art.

FIGS. 12A to 12E show plan views of various components forming a temperature measurement device according to the sixth embodiment of the present disclosure. FIGS. 13A to 13C show schematic views of the configuration of the temperature measurement device according to the sixth embodiment of the present disclosure. FIG. 13A is a plan view showing part of the temperature measurement device according to the present embodiment. FIG. 13B is a sectional view taken along a D1D1 line in FIG. 13A, and FIG. 13C is a sectional view taken along a D2D2 line in FIG. 13A.

A battery and a voltage monitoring device also having the function of the temperature measurement device are as described in the first embodiment.

Main components of the temperature measurement device according to the present embodiment are a case 30C, a holding member 70, an FPC 10C, an elastic body 40, and a pressing plate 50C. Note that a thermistor element T is attached to the FPC 10C in advance before these components are assembled.

As in each of the above-described embodiments, the resin case 30C according to the present embodiment is also provided with a through-hole 31. The FPC 10C according to the present embodiment has a basic configuration similar to that of the FPC 10 described in the first embodiment, and includes a trunk portion 10A and multiple branch portions 10B. Further, the FPC 10C includes a resin film 11 and multiple lines 12. Note that in the present embodiment, the holding member 70 also has the function of a contact plate 60, and therefore, no contact plate 60 is provided unlike each of the above-described embodiments.

The holding member 70 has a configuration similar to that described in the fourth embodiment, but is different from the fourth embodiment in that a through-hole for arranging the thermistor element T inside is not necessary. A holing plate portion 71 of the holding member 70 and a thermistor element region TX of the FPC 10C are bonded to each other with, e.g., an adhesive or a double-sided tape. Such a bonding process may be performed by an automated machine. The thermistor element region TX is bonded to the surface of the holing plate portion 71, which functions as the contact plate, opposite to the surface contacting a measurement target (cell 100 of the battery in the present embodiment).

The elastic body 40 is made of a foamed rubber-based or urethane foam-based foam material. In the present embodiment, the elastic body 40 has a rectangular parallelepiped shape, and at the center thereof, is provided with a through-hole 41 for arranging the thermistor element T inside. The pressing plate 50C is a plate-shaped member made of resin or metal.

As in the first embodiment, the thermistor element region TX of the FPC 10C and the elastic body 40 are positioned within an area where the through-hole 31 of the case 30C is provided, as viewed in the direction of pressing by the pressing plate 50C.

Using the above-described main components, a portion functioning as the temperature measurement device may be assembled in such a manner that the elastic body 40 is attached after the holding member 70 to which the FPC 10C is bonded has been attached to the case 30C and the pressing plate 50C is subsequently attached thereto, for example. The pressing plate 50C is fixed to the case 30C. A structure for fixing the pressing plate 50C to the case 30C is not specifically limited, and for example, a structure in which the case 30C is provided with an engagement protrusion 37 and the pressing plate 50C engages with the engagement protrusion 37 may be employed. Along with attachment of the pressing plate 50C to the case 30C, the thermistor element region TX of the FPC 10C and the holding member 70 are pressed by the pressing plate 50C through the elastic body 40.

With the above-described configuration, the thermistor element region TX of the FPC 10C is in a state of protruding, through the through-hole 31 of the case 30C, from the attachment surface side of the case 30C attached to the FPC 10C toward the surface side of the case 30C opposite to the surface attached to the FPC 10C. Note that the holding member 70 is provided with stoppers 72, and therefore, the holding member 70 does not drop to the surface side of the case 30C opposite to the surface attached to the FPC 10C through the through-hole 31 of the case 30C even when the holding member 70 is pressed by the pressing plate 50C through the elastic body 40 and the FPC 10C.

Note that in assembly as described above, the holding member 70 to which the FPC 10C is bonded, the elastic body 40, and the pressing plate 50C are only stacked on and attached to the case 30C from above in this order. Thus, an assembly process can be easily automated using an auto-mated machine such as an assembly robot. In the case of employing the above-described assembly method, the elastic body 40 is not necessarily bonded to the FPC 10C or the pressing plate 50C with, e.g., an adhesive or a double-sided tape. Note that for more reliably fixing the components to each other, the elastic body 40 and the FPC 10C may be bonded to each other with an adhesive or a double-sided tape and the elastic body 40 and the pressing plate 50C may be bonded to each other with an adhesive or a double-sided tape.

Using, e.g., the automated machine, the assembly process may be performed after the elastic body 40 and the FPC 10C have been bonded to each other in advance. In this case, the pressing plate 50C is attached after the FPC 10C (FPC 10C, holding member 70, and elastic body 40 bonded to each other) to which the elastic body 40 and the holding member 70 are bonded has been attached to the case 30, so that the portion functioning as the temperature measurement device can be assembled. Alternatively, the assembly process may be performed using. e.g., the automated machine after the elastic body 40 and the pressing plate 50C have been bonded to each other in advance. In this case, the holding member 70 to which the FPC 10 is bonded is attached to the case 30C, and thereafter, the pressing plate 50C to which the elastic body 40 is bonded is attached thereto. In this manner, the portion functioning as the temperature measurement device can be assembled. As another alternative, the assem-bly process may be performed using. e.g., the automated machine after the elastic body 40 and the FPC 10C have been bonded to each other and the elastic body 40 and the pressing plate 50C have been bonded to each other in advance. In this case, the FPC 10C, the holding member 70, the elastic body 40, and the pressing plate 50C integrally bonded to each other are attached to the case 30C, and in this manner, the portion functioning as the temperature measure-ment device can be assembled.

In any of the above-described assembly methods, various components are only stacked on and attached to the case 30C from above, and therefore, the assembly process can be easily automated using the automated machine such as the assembly robot.

The temperature measurement device configured as described above can also produce advantageous effects similar to those of the first embodiment. Moreover, in the present embodiment, the holding member 70 can reduce tilting of the thermistor element region TX. Further, in the present embodiment, the holding member 70 also has the function of the contact plate 60, and therefore, it is not necessary to separately attach the contact plate 60 to the FPC 10C.

The foregoing detailed description has been presented for the purposes of illustration and description. Many modifi-cations and variations are possible in light of the above teaching. It is not intended to be exhaustive or to limit the subject matter described herein to the precise form dis-closed. Although the subject matter has been described in language specific to structural features and/or methodologi-cal acts, it is to be understood that the subject matter defined in the appended claims is not necessarily limited to the specific features or acts described above. Rather, the specific features and acts described above are disclosed as example forms of implementing the claims appended hereto.

What is claimed is:

1. A temperature measurement device comprising:
a case;
a flexible printed circuit board attached to the case;
a pressing plate; and
an elastic body,
wherein the flexible printed circuit board includes a thermistor element region,
the elastic body is interposed between the thermistor element region and the pressing plate,
the pressing plate is configured to press the thermistor element region through the elastic body,
the case has a through-hole,
as viewed in a direction of pressing the thermistor element region by the pressing plate, the thermistor element region and the elastic body are positioned within an area where the through-hole is provided, and
the thermistor element region is configured to protrude, through the through-hole, from an attachment surface side of the case attached to the flexible printed circuit board toward a surface side of the case opposite to the attachment surface side.

2. The temperature measurement device according to claim 1, wherein
the flexible printed circuit board has a first positioning hole and a second positioning hole,
the first positioning hole and the second positioning hole are each provided on one side and another side of the thermistor element region,
the case or the pressing plate has protrusions each corre-sponding to the first positioning hole and the second positioning hole,
the protrusions are each inserted into the first positioning hole and the second positioning hole, by which the flexible printed circuit board is positioned on the case or the pressing plate, and
one of the first positioning hole or the second positioning hole is a long hole.

3. The temperature measurement device according to claim 1, further comprising:
a holding member,
wherein the holding member has a stopper, and is con-figured to hold the thermistor element region, and
the stopper is configured to reduce dropping of the holding member to the surface side of the case opposite to the attachment surface side through the through-hole.

4. The temperature measurement device according to claim 1, wherein the flexible printed circuit board further has, in addition to a line connected to a thermistor element, a line for measuring a voltage of a measurement target.

5. The temperature measurement device according to claim 1, wherein the elastic body is configured to press the thermistor element region to protrude through the through-hole.

6. The temperature measurement device according to claim 1, wherein the pressing plate presses the thermistor element region from outside the case.

\* \* \* \* \*